Sept. 8, 1953

C. E. MILLER 2,651,397

AUTOMATIC SELECTIVE AND SEQUENTIAL TUNER

Filed June 18, 1948

2 Sheets-Sheet 1

INVENTOR
Charles E. Miller
BY Philip G. Cooper
ATTORNEY

Sept. 8, 1953 C. E. MILLER 2,651,397

AUTOMATIC SELECTIVE AND SEQUENTIAL TUNER

Filed June 18, 1948 2 Sheets-Sheet 2

INVENTOR
Charles E. Miller
BY Philip [signature]
ATTORNEY

Patented Sept. 8, 1953

2,651,397

UNITED STATES PATENT OFFICE 2,651,397

AUTOMATIC SELECTIVE AND SEQUENTIAL TUNER

Charles E. Miller, Westmont, N. J., assignor to Radio Corporation of America, a corporation of Delaware Application June 18, 1948, Serial No. 33,694

8 Claims. (Cl. 192—143)

This invention pertains to a radio receiver tuning device, and more particularly to a tuner for permitting manual, selective and sequential tuning of a radio receiver.

It is an object of the present invention to provide a tuner for a radio receiver, said tuner having novel means for sequentially and selectively automatically obtaining individual station selection.

It is a further object of the invention to provide an automatic sequence tuner with push buttons to obtain individual station selection independently of the sequence operation.

A further object of the invention is to provide a tuner capable of selecting any desired preset station without the necessity of the tuner going through the operations for normal sequence tuning.

A further object of the invention is to provide a sequence tuner with means for obtaining any one of a plurality of preselected stations, and also to provide manual tuning at all times.

A further object of the invention is to provide a sequential tuner with means for automatically preventing the sequential operation of the tuner and permit individual push button selection of one of a plurality of preselected stations.

Further and other objects of the invention may be, and may become apparent, from a perusal of the disclosure herein. It is to be understood that while certain specific illustrations are presented, they are not to be considered as limitations except as defined by the spirit of the appended claims.

Figure 1:
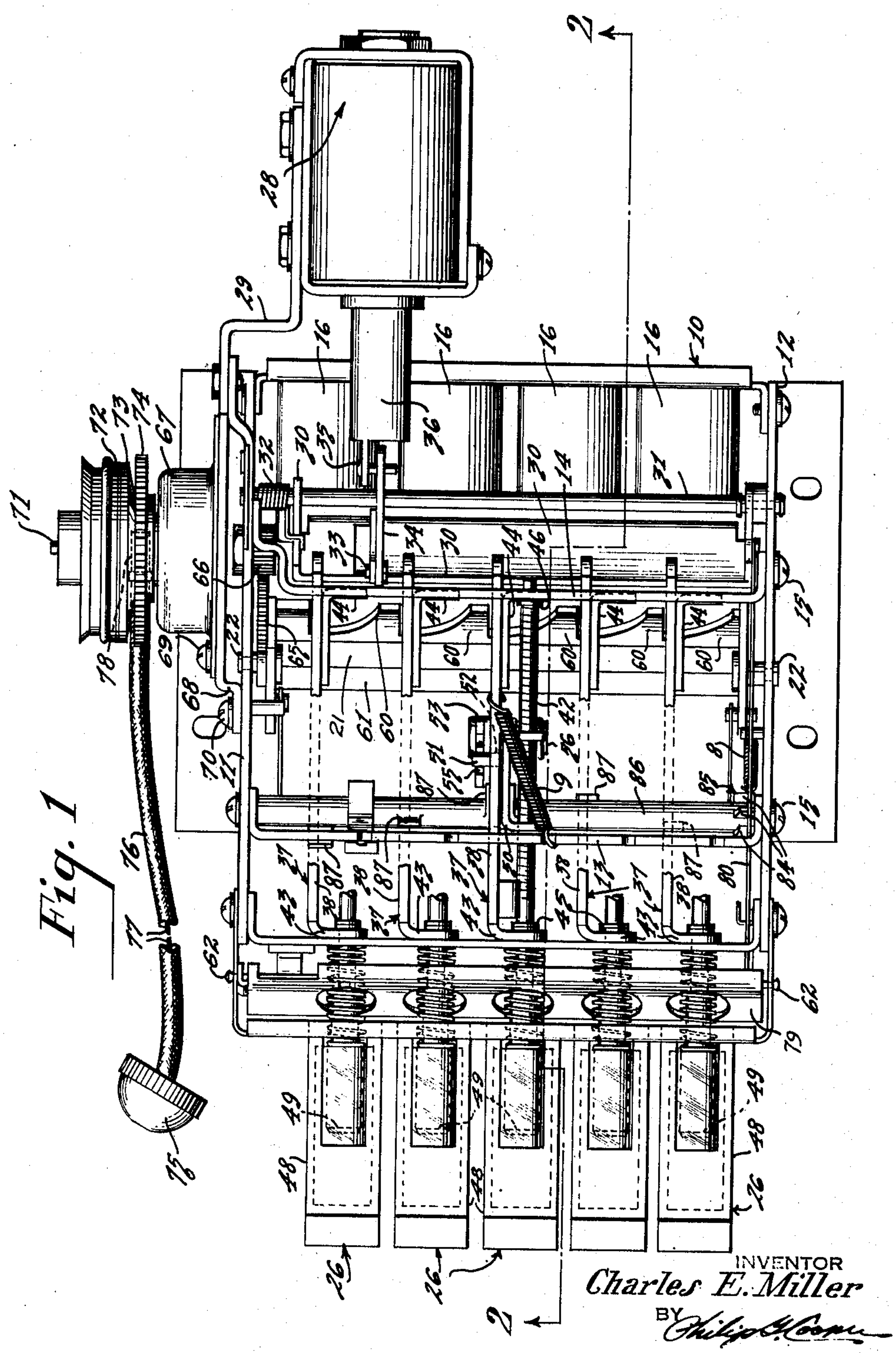
Fig. 1 is a partial plan view of the tuner for a radio receiver embodying the invention.

Referring to the drawings, there is shown a tuner 10 having a supporting structure which includes side frames 11 and 12 having a front bearing plate 13 and a rear bearing plate 14, each secured between the side frames 11 and 12 by means of screws 15.

Tuning elements, consisting of coils 16 having cores 17, which cores move axially within the coils 16 by means of core wires 18 and tuning screws 19. The tuning screws are threadedly mounted in the core bar 20, for adjusting purposes.

The movement of the core bar, which is mounted on pins 23 for longitudinal movement in side frame slots 24, will provide simultaneous movement of the cores 17 within the coils 16 to tune the radio receiver to the desired frequency for signal reception.

A rocker bar 21 is mounted on pins 22, which pins are pivotally disposed in the side frames 11 and 12. The lower end of the rocker bar 21 is pivotally connected by pivot pins 25 to either side of the core bar 20 so that rotation of the rocker bar 21 will cause the core bar to be moved linearly, and simultaneously move the cores 17 within the coils 16.

Figures 2, 3, 4:
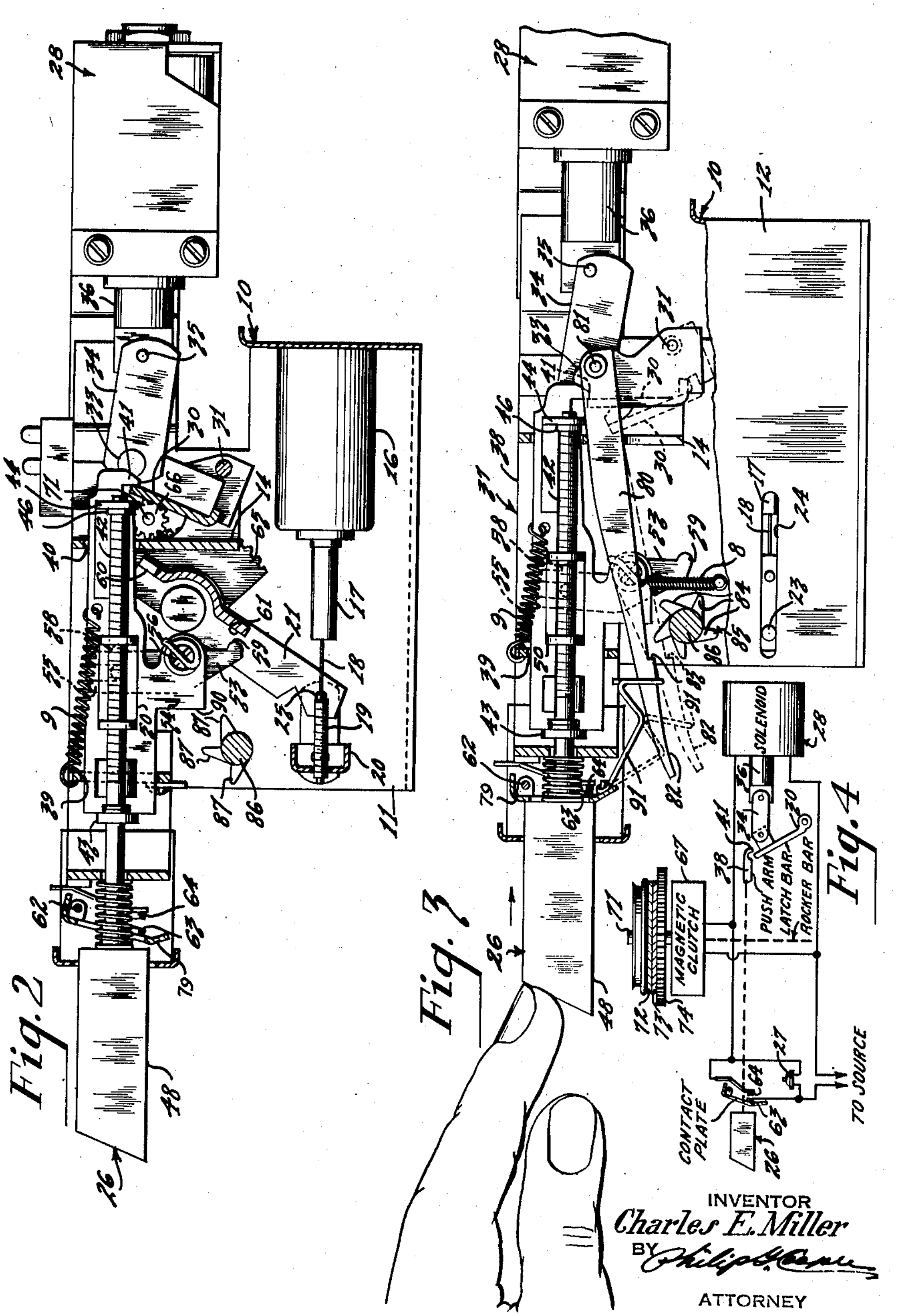
Fig. 2 is a partial sectional view taken substantially along lines 2—2 of Fig. 1 for normal sequential operation of the tuner.
Fig. 3 is a side view of the tuner, partially broken away, to show the arrangement of parts for selective operation of the tuner.
Fig. 4 is a partial pictorial and schematic representation for summarizing the automatic sequential and selective novel operation of the tuner.

There is shown a plurality of selective push buttons 26 and a single sequence push button 27, the manipulation of either the sequence push button or one of the selective push buttons will cause energization of a solenoid 28 mounted on a bracket 29 secured to the supporting structure. A latch bar 30 is pivotally mounted on a shaft 31, which shaft is journaled in the side frames 11 and 12. A spring 32 has opposing ends connected to the side frame 11 and one end of the latch bar 30 normally urging the upper portion of said latch bar away from the solenoid, as shown in Fig. 3, so that the upper end of the latch bar will rest normally against the rear bearing plate 14 when the solenoid is deenergized. The upper end of the latch bar 30 is pivotally connected by a pin 33 to a link 34, with the opposing end of the link 34 being connected by means of pin 35 to the solenoid core 36 of the solenoid 28.

There is a push arm assembly 37 for each of the five selective push buttons 26, one push arm being shown in detail in Fig. 1. Each push arm has a finger 38 which is movable in guide slots 39 located in the front bearing plate 13, and slots 40 located in the rear bearing plate 14. The rear portion of the push arm finger 38 has a shoulder 41 which may be engaged by the upper edge of the latch bar 30 when the push arm is moved sufficiently, either under the influence of the selective push button 26, or in response to ratchet operation, to be explained later, under the influence of the sequential push button.

A rod 42 is journaled for rotation in the L-shaped ears 43 and 44 formed adjacent opposing ends of the finger 38, and said rod 42 is restrained from axial movement by means of washers 45 and 46 which are secured to the rod 42 with the washers abutting the inner surfaces of the L-shaped members 43 and 44.

One end each of the rods 42, extends into the removable push button shell 48 so that when the shell is removed, the rods 42 may be rotated by means of the headed portion 49 which are keyed to the rods to permit rotation thereof. The portion of the rod 42 between the L-shaped portions 43 and 44 is threaded. A yoke 50 is secured to a pin 51, which pin is adapted to ride in a slot 52 formed longitudinally in the finger 38. The opposing ends of the yoke 50 are threaded to provide threaded engagement between the yoke 50 and the threaded portion of the rod 42 so that rotation of the headed portion 49 will cause the rod 42 to move the yoke along the slot 52.

A push arm cam 53 is pivotally secured by a pin 56 to a protuberance 54 formed on the lower part of the push arm finger 38. The upper end of the push arm cam 53 has a forked portion 55 which movably engages the slidable yoke pin 51. This arrangement permits the push arm cam 53 to be moved angularly on its pivot pin 56 due to the rotation of the rod 42 which moves the pin 51 secured to the yoke 50. Shoulders 58 and 59 formed adjacent the upper and lower ends respectively, of the push arm cam 53 are adapted to engage the upper and lower contact surfaces 60 and 61 respectively, on the rocker bar 21.

Pressure applied to the selective push button 26 will cause the push arm 37 to be moved inwardly until the shoulder 41 on the inner end of the finger 38 is moved into the path of the upper end of the latch bar 30. The shell 48, by continued inward movement, engages a contact plate 79 which is pivotally mounted between the side frames 11 and 12 by means of pins such as 62. Contact 63 carried by the movable contact plate 79 engages contact 64 held by the stationary framework and the contacts are connected to energize the solenoid 28 when engaged. Energization of the solenoid 28 will cause the upper edge of the latch bar 30 to rotate and engage the shoulder 41 of the particular push arm selectively advanced. Continued further inward movement of the solenoid core 36 into the solenoid coil will cause the push arm to be moved rearwardly until the protuberances 58 and 59 evenly engage the surfaces 60 and 61 of the rocker bar 21. It will, therefore, be seen that the disposition of the yoke 50 in accordance with the rotation of the threaded rod 42 will cause the push arm cam 53 to have an angular setting, depending on the disposition of the yoke on the rod 42, which in turn determines the relative position of the cores 17 within the coils 16, and the ultimate tuning to the frequency of the desired radio station.

The rocker arm 21 has a gear segment 65 secured thereto and positioned to engage a pinion gear 66 carried by a magnetic clutch 67 secured to a bracket 68 by screws 69. The bracket 68 is in turn secured to the side frame 11 by screws 70. The magnetic clutch 67 is of a conventional type having a shaft 71 upon which the pinion gear on the inner end 66 is connected with a clutch plate 72 secured adjacent the outer end of the shaft. A second clutch plate 73 and a gear 74 are mounted for free rotation on the shaft 71. A manual control knob 75 has a flexible cable 76 with a flexible connecting shaft 77 disposed within the cable 76 for connecting the manual control knob 75 to a worm gear 78 which engages the clutch gear 74. Normally, when the magnetic clutch 67 is deenergized, a spring urges the clutch plates 72 and 73 into frictional engagement with each other so that normally any rotation of the manual control knob 75 will cause the shaft 71 to rotate which in turn rotates the pinion gear 66, the segment gear 65 and the rocker arm 21 to move the core bar 20 for manually tuning the radio receiver. It will be seen that when the magnetic clutch 67 is energized, the clutch plates 72 and 73 will be disengaged so that the manual control knob has no effect on the tuning of the radio receiver. Energization of the magnetic clutch 67 consequently removes the drag of the manual control gear 67 and its associated parts when selective tuning is desired. Energization of the magnetic clutch always takes place when either selective tuning or sequential tuning is employed.

A cam shaft link 80, normally urged downwardly by spring 8, is pivotally connected by a pin 81 (Fig. 3) adjacent the upper portion of the latch bar 30. The opposing end of the cam shaft link 80 has a camming surface 82 and a latch portion 83. The latch portion 83 is positioned to normally engage one of the teeth 84 of a ratchet 85 secured on one end of a cam shaft 86, the cam shaft being pivotally mounted between opopsing side frame members 11 and 12 of the supporting structure. When the latch bar 30 is rotated on its pivot pins 31, the cam shaft link 80 during sequential tuning normally rests on the ratchet 85 so that movement of the latch bar 30 will cause rotation of the ratchet and the cam shaft 86.

The cam shaft has a plurality of camming fingers 87 (Fig. 1), one camming finger being associated with each of the push arms 37. The cam fingers 87 are equiangularly and spacially disposed axially on the cam shaft 86.

Fig. 2 shows the cam shaft 86 with the cam fingers 87 disposed thereon so that during normal sequential operation, the rotation of the cam shaft 86 will cause one of the cam fingers 87 to engage the surface 90 formed on the protuberance 54 of the push arm finger 38.

In Fig. 3, the selective push button 26 is shown being pressed inwardly with the contact set 63—64 closed so that the solenoid has just been energized, but before the solenoid has had time to operate. A cam shaft link lever 91 is secured to the lower end of the contact plate 79 with the free end of the cam shaft link lever 91 riding on the camming surface 82. In the solid line showing of the cam shaft link 80 and the cam shaft link lever 91 (Fig. 3), the inward movement of the selective push button has caused the cam shaft link lever to elevate the free end of the cam shaft link 80 so that when the solenoid 28 moves the latch bar 30, the camming surface 82 of the cam shaft link will ride on the cam shaft link lever 91 in its elevated position, thereby preventing the cam shaft link 80 from rotating the ratchet 85. As soon as the selective push button 26 is released, the cam shaft link 80 and the cam shaft link lever will be restored to the normal position shown in dotted lines in Fig. 3.

Referring to Fig. 4, the pictorial representation presented herein is used for briefly summarizing the major functions of the invention.

*Sequential operation*

For sequential operation of the tuner, the operation of the sequential push button 27 will simultaneously energize the magnetic clutch 67 and the solenoid 28. Energization of the magnetic clutch separates the clutch discs 72 and 73, thereby removing the frictional drag normally presented by the manual control parts. Energization of solenoid 28 will cause the link 34 to rotate the latch bar 30 in a clockwise direction as seen in Figures 2 and 3. The cam shaft link (Fig. 3) will cause the ratchet 85 to turn sufficiently so that the cam shaft 86 will cause the next successive cam finger 87 to engage the surface 90 on the protuberance 54 of one of the fingers 38 so that the shoulder 41 of the push arm will be urged into the path of the upper portion of the latch bar 30 and continued motion of the latch bar will move the push arm 37 until the rocker bar has even pressure applied to the surfaces 60 and 61 caused by engagement with the protuberance 58 and 59 formed on the push arm cam 55.

As soon as the solenoid 28 is deenergized, the retractile spring 9, which is connected to the front bearing plate 13 and the finger 38, will draw the finger 38 to its normal position, and simultaneously the deenergization of the magnetic clutch 67 will cause the clutch plates 72 and 73 to engage the rocker bar, indicated by legend in Fig. 4, represented by a center line on the center of the shaft 71. The engagement of clutch plates 72 and 73 will consequently hold the rocker bar in the fixed position at which the rocker bar was located at the innermost position of the actuated push arm. At this point, all parts are restored to normal and the station is properly tuned in. When the sequential push button 27 is again operated, there will be a further movement of the cam shaft by the next successive cam shaft tooth 85, with a consequent rotation of the cam shaft and the operation of the next successive push arm 37 by its corresponding cam shaft finger 87. This successive operation of push arms will continue repetitively for each actuation of the sequential push button 27.

*Selective operation*

The selective operation of the tuner takes place when a particular selective push button 26 is urged inwardly. The initial movement of the push arm 37 causes the finger 38 with its corresponding shoulder 41 to be moved into the path of the latch bar. As soon as the contact plate is moved to close contact sets 63 and 64, the magnetic clutch is energized, thereby separating the clutch plates 72 and 73, and simultaneously energizing solenoid 28. As previously explained, the cam shaft link lever 91 will have raised the cam shaft link 80 so that there will be no operation of the cam shaft 86, and the inward movement of the core 36 within the solenoid coil will cause the latch bar to urge the push arm inwardly until the push arm cam properly engages the rocker bar in the same manner as when the tuner is sequentially operated. Release of the selective push button will cause the contact set 63—64 to open, thereby deenergizing the solenoid, at which time the engagement of clutch plates 72 and 73 will hold the rocker bar in its adjusted position, and the influence of retractile spring 9 will restore the push arm to normal.

From the foregoing, it will be seen that the tuner at all times is capable of either manual control, sequential control of preselected stations, or selective control of preselected stations. Operation of either the sequential push button or the selective push button automatically removes the manual control during either the selective or sequential operation, and the manual control is immediately restored to operative condition upon normal restoration of either the sequential or selective push button.

While specific arrangement of parts have been shown to illustrate the invention, it is to be understood that changes and modifications may be made therein without departing from the spirit of the invention as defined by the appended claims.

What is claimed is:

1. An automatic tuning device having a supporting structure; a positionable tuning member mounted on said supporting structure; a plurality of push arm assemblies each provided with a push button and having means associated with said tuning member for individually operating said tuning member into preselected positions; mechanism having means sequentially connected with said push arm assemblies for operating same, a manual tuning assembly independently operable with respect to said push arm assemblies and connected to said tuning member for tuning same over a continuous range, said manual tuning assembly including a releasable clutch structure normally coupling said manual assembly with said tuning member; and control elements responsive to said push arm assemblies and including means for releasing said clutch, disconnecting said sequence mechanism, and actuating the selectably manipulated push arm assembly to effect the preselected tuning.

2. An automatic tuner having a supporting structure; a positionable tuning member movably mounted on said supporting structure; a plurality of push arm assemblies each having means associated with said member for individually operating same and provided with adjustment members for adjusting same to a preselected position when operated to obtain signal reception; camming elements having means sequentially connected to said push arm assemblies for operating same; a tuning control independently operable with respect to said push arm assemblies and camming elements for manually operating said tuning member over a continuous range, said tuning control including a releasable clutch normally coupling said control to said tuning member; and an electrically operable means connected to said clutch and associated with said push arm assemblies for releasing said clutch and actuating said assemblies, said electrically operable means including a manual control for effecting energization of same.

3. An automatic tuner having a supporting structure; a positionable tuning member mounted on said supporting structure; a plurality of adjustable push arm assemblies each having means associated with said tuning member for individually bringing said member to a preselected position; mechanism having camming means sequentially connected to said push arm assemblies for operating same, said camming means including a cam shaft having thereon a plurality of equiangularly disposed camming fingers in spaced relation, one camming finger for each of said push arm assemblies; a tuning control independently operable with respect to said push arm assemblies for manually operating said tuning elements over a continuous range, said tuning control including a releasable clutch normally coupling said tuning element to said control; and an electrically operable means connected to said clutch and operatively positioned with respect to said push arm assemblies for releasing said clutch and actuating said assemblies, said electrically operable means including a manual control for effecting energization of same.

4. An automatic tuner having a supporting structure; a positional tuning member mounted on said supporting structure; a plurality of push arm assemblies each having means associated with said tuning member for operating same and being provided with adjustment means for adjusting the assembly when operated to obtain preselected signal reception; a camming device having means sequentially connected to said push arm assembly for operating same, said means including a cam shaft having thereon a ratchet and a plurality of equiangularly disposed camming fingers in spaced relation, and a cam shaft lever for rotating said cam shaft; a tuning control independently operable with respect to said push arm assemblies for manually operating said tuning member over a continuous range, said tuning control including a releasable clutch normally coupling said tuning member to said tuning control; and an electrically operable assembly connected to said clutch and operatively positioned with respect to said push arm assembly for releasing said clutch and actuating said assemblies, said electrically operable assembly including a manual control for effecting energization of same.

5. An automatic tuning device having a supporting structure; a positional tuning member mounted on said supporting structure; a plurality of push arm assemblies, each having means associated with said tuning member for operating same, and provided with a push button and an adjustment element for stopping said selected assembly when moved to a desired position; a camming assembly sequentially connected to said push arm assembly for operating same; a control device operatively connected to said push button and responsive to movement thereof and including means for immobilizing said camming mechanism and completing movement of said push arm assemblies to the desired tuning position.

6. An automatic tuner having a supporting structure; a positional tuning element mounted on said supporting structure; a plurality of adjustable push arm assemblies each provided with a push button and having means associated with said tuning member for individually bringing said member to a preselected position; a camming mechanism including means sequentially connected to said push arm assemblies for operating same, said means including a cam shaft having thereon a ratchet and a plurality of equiangularly disposed camming fingers, one for each of the push arm assemblies, and a cam shaft lever for actuating said ratchet; and electrically operable means positioned with respect to said push arm assemblies for operating same, said electrically operable means having a control device connected to said push button and responsive to movement thereof and including means for immobilizing said camming means and a switch for allowing energization of said electrically operable means.

7. An automatic tuner having a supporting structure; a positionable tuning member mounted on said supporting structure; a plurality of adjustable push arm assemblies each provided with a push button and having means associated with said tuning member for moving said member to a preselected position; mechanism sequentially connected with said push arm assemblies for operating same; a manual tuning control for operating said tuning member independently with respect to said push arm assemblies over a continuous range, said manual tuning control including a releasable clutch normally coupling said control to said tuning member; and electrically operable assembly positioned with respect to said push arm assemblies for operating same and including a control device connected to said push buttons and responsive to movement thereof, said control device having a lever for immobilizing said camming mechanism and a switch for releasing said clutch and allowing energization of said electrically operable assembly.

8. An automatic tuner having a supporting structure; a positionable tuning member mounted on said supporting structure; a plurality of push arm assemblies each having means associated with said tuning member for bringing said tuning member to preselected position; camming mechanism sequentially connected to said push arm assemblies for operating same, said camming mechanism including a cam shaft having thereon a plurality of equiangularly disposed camming fingers in spaced relation; a manual control having means coupled to said tuning member for operating same, said means including a releasable clutch normally coupling said tuning member to said control; an electrically operable assembly operatively positioned with respect to said camming mechanism for operating same and including a link means to operate said cam shaft, and, including a manually operable element connected to said clutch to release same and effect energization of said electrically operable means.

CHARLES E. MILLER.

References Cited in the file of this patent

UNITED STATES PATENTS

| Number | Name | Date |
|---|---|---|
| 2,305,720 | Swallow | Dec. 15, 1942 |
| 2,310,720 | Wandrey | Feb. 9, 1943 |
| 2,357,775 | Tyzzer | Sept. 5, 1944 |
| 2,435,522 | Wagenknecht | Feb. 3, 1948 |
| 2,452,384 | McDonald, Jr. | Oct. 26, 1948 |
| 2,502,682 | Wagenknecht et al. | Apr. 4, 1950 |